(12) United States Patent
Van De Meerendonk

(10) Patent No.: US 11,277,998 B2
(45) Date of Patent: Mar. 22, 2022

(54) MILKING SYSTEM

(71) Applicant: LELY PATENT N.V., Maassluis (NL)

(72) Inventor: Robertus Carolus Maria Van De Meerendonk, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 109 days.

(21) Appl. No.: 16/625,365

(22) PCT Filed: Jun. 14, 2018

(86) PCT No.: PCT/NL2018/050390
§ 371 (c)(1),
(2) Date: Dec. 20, 2019

(87) PCT Pub. No.: WO2019/004819
PCT Pub. Date: Jan. 3, 2019

(65) Prior Publication Data
US 2021/0076631 A1  Mar. 18, 2021

(30) Foreign Application Priority Data

Jun. 27, 2017 (NL) .................................... 2019129

(51) Int. Cl.
*A01J 5/007* (2006.01)
*A01J 11/10* (2006.01)
*A01J 5/017* (2006.01)

(52) U.S. Cl.
CPC .............. *A01J 5/007* (2013.01); *A01J 11/10* (2013.01); *A01J 5/017* (2013.01)

(58) Field of Classification Search
CPC ... A01J 11/10; A01J 11/00; A01J 5/017; A01J 5/007
See application file for complete search history.

(56) References Cited

U.S. PATENT DOCUMENTS

| 3,961,570 | A | * | 6/1976 | Sanden | A01J 11/10 99/452 |
| 4,144,804 | A | * | 3/1979 | O'Keefe | A01J 11/10 137/110 |

(Continued)

FOREIGN PATENT DOCUMENTS

| DE | 38 14 761 A1 | 11/1988 |
| DE | 44 07 061 A1 | 9/1995 |
| WO | WO 2010/071413 A2 | 6/2010 |

OTHER PUBLICATIONS

International Search Report dated Sep. 28, 2018 in PCT/NL2018/050390 filed Jun. 14, 2018.

*Primary Examiner* — Joshua D Huson
*Assistant Examiner* — Caleb Kelsey Hrubes
(74) *Attorney, Agent, or Firm* — Oblon, McClelland, Maier & Neustadt, L.L.P.

(57) ABSTRACT

A milking system includes an automatic robotic milking device having a control unit, and is configured to milk a dairy animal fully automatically to form a milking. The system also includes a milk treatment device connected to the milking device for receiving and treating the milked milk of the milking. The milking device includes an animal identification device which is operatively connected to the control unit for identifying the dairy animal and comprises an animal database with information about at least the composition of the milk from the dairy animal, and/or a milk sensor device which is operatively connected to the control unit for collecting information about the composition of the milked milk. The milk treatment device is connected to the control unit and includes a standardization device which is configured to standardize a fat content and/or a protein content of the milk of the milking.

6 Claims, 1 Drawing Sheet

(56) References Cited

U.S. PATENT DOCUMENTS

| | | | |
|---|---|---|---|
| 7,600,484 B2 * | 10/2009 | Claycomb | A01J 5/0134 119/14.02 |
| 2010/0068345 A1 * | 3/2010 | Tamminga | A01J 11/00 426/72 |

* cited by examiner

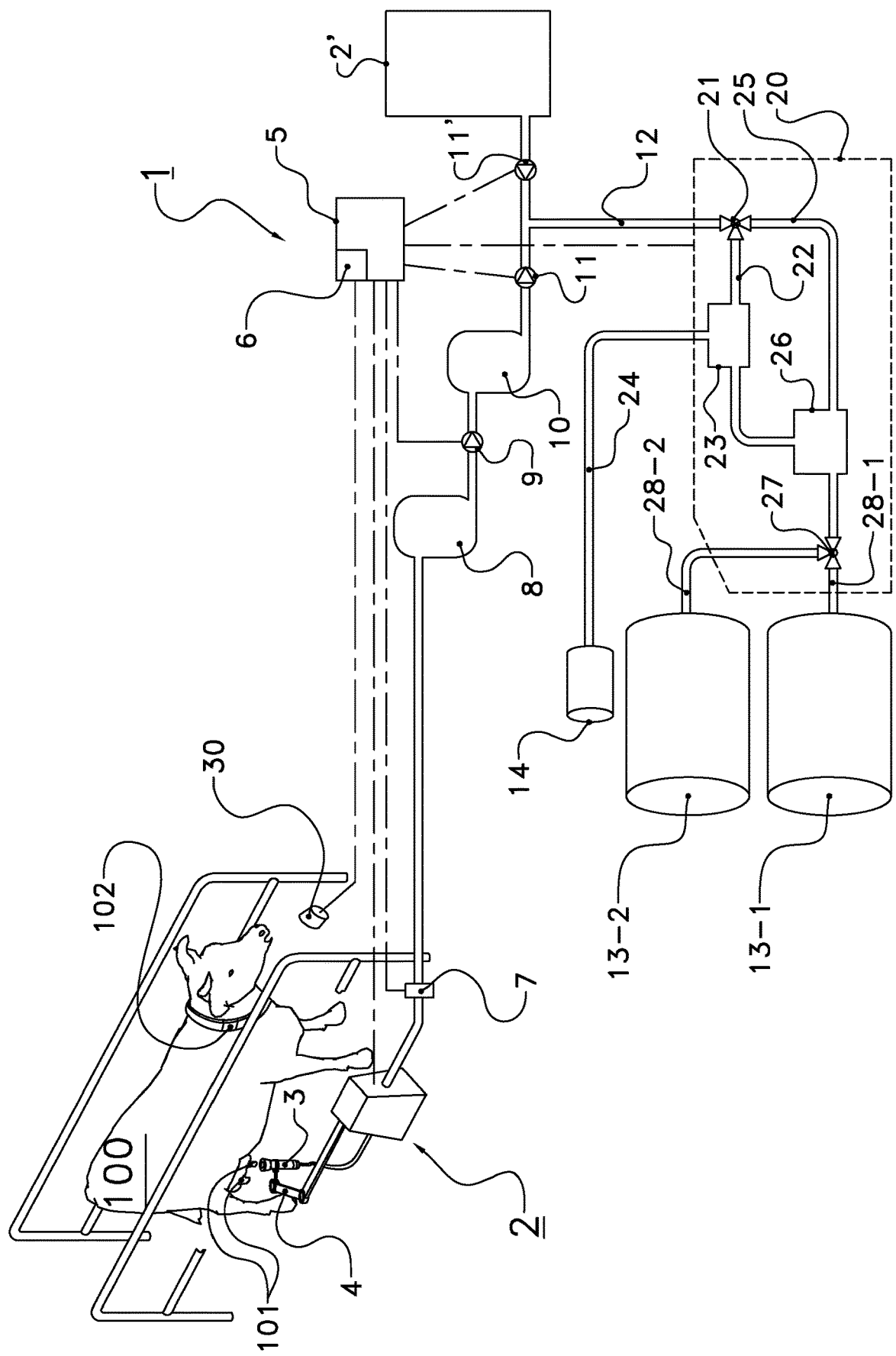

MILKING SYSTEM

BACKGROUND OF INVENTION

The present invention relates to automatic milking systems, in particular to a milking system, comprising an automatic robotic milking device having a control unit and being configured to milk a dairy animal fully automatically to form a milking, and a milk treatment device connected to the milking device for receiving and treating the milked milk of the milking, wherein the milking device comprises an animal identification device which is operatively connected to the control unit for identifying the dairy animal and comprising an animal database with information about at least the composition of the milk from the dairy animal, and/or a milk sensor device which is operatively connected to the control unit for collecting information about the composition of the milked milk.

DESCRIPTION OF THE RELATED ART

Such milking systems are generally known in the prior art. Thus, for example, the Lely Astronaut® and DeLaval VMS™ milking robots are commercially available. The milk from dairy animals which are milked by means of such systems is usually supplied to dairy factories. However, farmhouse dairy products are becoming increasingly popular. It has been found that the current milking systems are often not able to meet the requirements of the law and/or consumer with regard to the dairy products which are produced and made commercially available in this way with, in addition, a relatively high efficiency and accuracy.

BRIEF SUMMARY OF THE INVENTION

It is therefore an object of the present invention to provide a milking system of the type mentioned in the introduction which is better equipped for producing farmhouse dairy products which meet the requirements of the law and the demands of the consumer.

This object is achieved by the invention by a milking system as claimed in claim 1, in particular a milking system, comprising an automatic robotic milking device having a control unit and being configured to milk a dairy animal fully automatically to form a milking, and a milk treatment device connected to the milking device for receiving and treating the milked milk of the milking, wherein the milking device comprises an animal identification device which is operatively connected to the control unit for identifying the dairy animal and comprises an animal database with information about at least the composition, and in particular the amount, of the milk from the dairy animal, and/or a milk sensor device which is operatively connected to the control unit for collecting information about the composition, and in particular the amount, of the milked milk, wherein the milk treatment device is connected to the control unit for receiving said information, and comprises a standardization device which is configured to standardize a fat content and/or a protein content of the milk of the milking, wherein the milk treatment device controls the standardization device in order to standardize the milk of the milking on the basis of the information associated with that milking. By means of the milking system according to the invention, it is easily possible to efficiently produce milk products which meet requirements and demands, in particular products which meet a certain standard. The best known example of such a standard is the indication "semi-skimmed" for milk, which indicates that the milk contains between 1.5 and 1.8% of milk fat. Other contents have also been standardized, such as "skimmed" to a content of less than 0.5%, and full-fat milk to a content of 3.5%, although the latter is often also viewed as a minimum content. Furthermore, similar to milk fat, the protein content is also being standardized more and more often, in particular in order to be able to offer the consumer an identical product throughout the year.

The invention is able to provide such a product in a quick and simple manner by using the already established properties with regard to composition and the amount information of the milked milk. In this way, the milk can be processed efficiently without having to process all the milk first. In addition, it is possible to process the milk in batches separately, for example per milking, to form one or more desired products. These may also be stored as separate products.

For example, use is made of information which is stored in an animal database which is provided in the milking system and is operatively connected to the milking device. Advantageously, the control unit is configured to retrieve said information from the animal database by means of the animal identification device. The control unit can then adjust the standardization device to standardize the milk of the milking using exactly the correct settings. It should be noted that said information will in this case often be historic information, such as composition information which is determined per dairy animal using the milk samples which are taken at regular intervals. Furthermore, the amount information will differ for each milking operation/milking, but this information is in principle stored immediately after the milking operation and is then available to the standardization device for further use. On the basis of an analysis of the historical values, it is possible to determine if these values are sufficiently accurate to satisfy the requirements and demands.

Alternatively or in addition, and advantageously, use is made of a milk sensor device operatively connected to the control unit for collecting information about the composition, and in particular the amount, of the milked milk. By means of the sensor device, at least the amount and also a milkfat content and/or a protein content is determined for each milking. On the basis thereof, the control unit which is programmed for this purpose can calculate how the standardization device has to be set in order to achieve the desired content(s) in the milk. The milk sensor device may be provided at any suitable location in the milking system, such as in or under the milking cup(s) of the milking device. Also, the milk sensor device may be provided in the milk jar of the milking device in which the milk of a milking is stored during milking. The latter offers the advantage that the milk sensor device only has to perform a single measurement which may, however, be performed in a more simple and accurate way. The first-mentioned location(s) for the milk sensor device offer the advantage that even during a milking operation, the milk can still be separated. For example, it is known that the first milk of a milking has a much lower fat content than the last milk. If this first and second/last partial amount of milk are separated, it is for example possible to process the first amount to form skimmed or semi-skimmed milk and to process the second amount to form full-fat milk. In this way, a more moderate or smaller skimming operation is required which may be advantageous with regard to energy consumption and the milk quality. However, with the embodiment comprising the milk sensor device which measures in line in or behind the milking cup, the measured composition values have to be weighted with the associated amount values in order to arrive at a total value for the milking or the partial amount.

A further significant advantage of the invention is that the milk can be standardized for each milking or partial amount thereof. This may offer advantages if the milked milk of one or more dairy animals differs from the milk of the other dairy animals. For example, milk is divided into A1 milk and A2 milk, depending on the type of beta casein protein which the dairy animal produces. This and other different types of milk, such as special milk from genetically different or modified dairy animals, can then be processed in batches, i.e. per milking, by one and the same standardization device to produce different consumer products. If desired, these standardized products can then be stored with or without cooling. With conventional milking devices, the milk cannot be processed to form a separate standardized product and stored, and the individual milk properties would not be reflected in the product.

It should be noted here that the term "standardize" is understood to mean that the content of a certain substance in the milk is taken to a standard value, if desired after it has been checked. For example, the fat content of semi-skimmed milk is taken to between 1.5 and 1.8%, often 1.5%. A much used method to achieve this is to skim the milk completely and then add cream in a desired weight ratio. It will be clear that this method is not very efficient, in particular with regard to energy consumption, and that it could also result in a loss of quality, due to the intensive processing of the milk.

In embodiments, the standardization device comprises a splitting device for splitting the received milking into an adjustable first part and a second part, a removing device for receiving said first part of the milking, and for removing fat and/or protein from the first part, and dispensing the milk of the first part which has thus been processed as processed milk, and a combining device for combining the processed milk and the second part of the milking to form standardized milk, wherein the standardization device sets a ratio between the first part and the second part by means of the splitting device, based on the information received about said milking. A significant advantage of this embodiment according to the invention is that, based on information from the milking device, only a (small) known part of the milk has to be skimmed, while the rest of the milk, of the respective milking or otherwise, can be left undisturbed. Obviously, this method and device are more advantageous energetically than those where all the milk is skimmed and subsequently (re)combined again as desired. It is stressed again that the control of the standardization device on the basis of the data from the milking device makes this possible in a very efficient way, while retaining the possibility of treating and storing each milking separately. It will also be clear that it is thus possible to use a removing device with a capacity which is as low as possible. In addition, it is important, in particular with batch-wise processing, that the product streams do not become too small. The invention provides this by not, as is known for large dairy factories, first completely removing an element from all the milk in order then to add said element again in a controlled manner, but in very small amounts, but by only removing said element from only a part of the milk. The amount of milk to be treated is always much larger than the amount of the element which is optionally to be added again, as a result of which the latter can be carried out more accurately in a simple manner.

In embodiments, the removing device comprises a centrifuge for skimming the first part. A centrifuge is a commonly used device for skimming milk, but it is also possible to use other removing devices, for example devices for filtration, chromatography and/or ion exchange in order to separate milk protein(s) from milk or milk serum. In this case, it may again be advantageous with regard to energy consumption that only a limited part of the milk has to be processed and, for example, it is possible to choose a device with a relatively small capacity.

In embodiments, the milking device comprises one or more robotic milking devices which can be visited voluntarily by the dairy animal. In embodiments, the milking system comprises several automatic milking devices, each of which is connected to the milk treatment device, and wherein the control units are configured to send each milking, together with the associated information, to the milk treatment device separately.

In these embodiments, the dairy animal chooses its milking moments itself, which may contribute to a reduction in a stress level. Furthermore, it is possible to process each milking separately. This is obvious in the case of a single milking device, but can also be achieved in the case of several milking devices, for example by pumping each milking, which is collected for each milking device in each case in an associated milk jar, into the milk pipe separately. In this case, there will hardly be any mixing of milk, if at all. In addition, it is readily possible to keep track of which milking is situated in which part of the milk pipe by means of a flow meter provided for the purpose. Thus, it is also possible to treat and store milkings separately. And because the milk can be processed per milking, this does not matter in principle with regard to the requirements for the rest of the milking system. In particular, because the capacity, at least the current capacity, of the milk treatment device can be adjusted by the control unit to the currently obtained amount of milk and the composition thereof. Nevertheless, it is also possible to use forced cow traffic, in which case dairy animals are forced to a milking device, such as a carousel, for example the DeLaval AMR of GEA DairyProQ, in groups. In case of such forced cow traffic, dairy animals are often milked twice a day, and continuously. Consequently, the required capacity of the milk treatment device will often have to be somewhat larger than is the case with free cow traffic. After all, there is hardly any opportunity to "spread out" the pumping of the obtained milk further, if at all, which is particularly noticeable with fast-milking dairy animals which combine a high production with a short milking time. Nevertheless, it is still possible to achieve the further advantages of the present invention.

In embodiments, each milking device comprises a first milk jar for collecting the milking and a first milk pump for pumping the milking out of the milk jar, wherein each milk jar is connected to a milk pipe running towards the milk treatment device, wherein furthermore a second milk jar is provided between each first milk pump and the milk treatment device for collecting the milking pumped by the first milk pump, as well as a second milk pump for pumping the milking from the second milk jar to the milk treatment device. These embodiments provide the possibility to pump the milk of a milking to the milk treatment device with little or no loss of capacity of the milking system in a very controlled manner and at a low flow rate. In this case, the milking is first pumped from the first milk jar to the second milk jar by means of the first milk pump. This may be carried out quickly, in particular at least as quickly as is the case with conventional milking devices. The milking device can then be made available quickly for a subsequent milking, so that the total milking capacity remains at least equal. Then, the second milk pump can pump the milking to the milk treatment device at a much lower velocity/flow rate. In principle, the second milk pump may take much longer to pump, namely at most until the end of the next milking in the associated milking device. The control unit can control the second milk pump accordingly. Due to this much lower flow rate, the capacity or the current capacity of the milk treatment device may accordingly be selected to be lower. Additionally, the lower flow rate may also lead to an improved separation, both of milkings with respect to each other and of milkand air in the milking, and pre-treatment may be improved as well. These advantages can be achieved in an optimum manner with a milking system comprising a single milking device. But an advantage may also be obtained if the milking system comprises several milking devices with corresponding numbers of first and second milk jars. This is possible, for example, by using parallel milk pipes, so that each milking device can pass the milk to the milk treatment device independently. However, it is also possible for two or more, or even all, second milk jarsto be connected to one and the same milk pipe. The control unit may then be configured, be programmed, to successively switch on the respective second milk pumps in such a way that each of these can pump its associated milking separately into the milk pipe. It thus remains ensured that every milking can be treated separately, depending on the amount and composition. In addition, it still holds true that the total pumping time for all milkings in the milking system is longer in most cases than is the case with a corresponding known milking system, since pumping can be effected independently from milkings, and thus can be spread out over the total milking time, including preparation time, and optionally time between milkings.

The invention will now be explained in more detail by means of a non-limiting exemplary embodiment in the drawing, in which the sole FIG. 1 shows a diagrammatic representation of a milking system according to the invention.

BRIEF DESCRIPTION OF THE SEVERAL VIEWS OF THE DRAWINGS

FIG. 1 shows a milking system which is generally denoted by reference numeral 1, and serves for milking a dairy animal 100 with teats 101 and an ID tag 102. The milking system 1 comprises an automatic robotic milking system 2 with milking cups 3 (only one of which is shown), and a robot arm 4 and a control unit 5 with a database 6.

DETAILED DESCRIPTION OF THE INVENTION

The milking system 1 furthermore comprises a sensor 7, a first milk jar 8, a first milk pump 9, a second milk jar 10, a second milk pump 11 and a milk pipe 12, as well as a generally indicated milk treatment device 20, two milk tanks 13-1 and 13-2 and a cream tank 14, and an animal identification device 30.

The milk treatment device 20 acts as a standardization device, and comprises a splitting device in the form of a controllable first three-way valve 21, a first branch line 22, a skimmer 23 with a cream discharge 24, a second branch line 25, a combining device 26, a controllable second three-way valve 27 and respective milk product discharges 28-1 and 28-2.

Finally, the milking system also comprises an optional second milking device 2', of which only the second milk pump 11' is shown.

The illustrated milking system 1 here comprises two robotic milking devices 2 and 2'. However, any other number, such as one or three, four, etc. is also possible. As usual, the robotic milking devices 2, 2' comprise a robot arm 4 for connecting milking cups 3 to teats 101 of a dairy animal 100, often cows. Although only cows will be discussed below, goats and the like are also possible. The milking devices are in principle visited on a voluntary basis by the dairy animals 100, although so-called forced traffic is in principle also possible, in which case the dairy animals are forced towards the milking device(s) in groups. It will be clear that with free traffic of dairy animals, the milk yield will vary over the course of a day.

The milk from a milking of the dairy animal 100 forms a milking, which is collected in an automatic milking device 2 in a milk jar in a known manner, here the first milk jar 8, and is then pumped off by a milk pump, here the first milk pump 9, for further processing in the milking system. The function of the second milk jar 10 and the second milk pump 11, both optional, will be explained in more detail below. In the milking system 1 according to the invention, the milk of the milking is then passed, via the milk pipe 12, to the milk treatment device 20, here embodied as a standardization device for the milking.

Here, the milk treatment device/standardization device 20 serves to standardize the fat content of the milk of the milking. The milk enters the standardization device 20 via milk pipe 12. A first part of the entering milk is passed to a skimmer 23 via the three-way valve 21 controllable by the control unit 5 and via the first branch line 22 where the fat, i.e. the cream, is separated from the milk and the skimmed milk which is now substantially fat-free is discharged. The other, second part of the milk passes through the second branch line 25 substantially unchanged. In the combining device 26, both streams, of skimmed milk and unmodified milk, are combined to form a desired milk product. In this case, a desired milk product preferably has a fixed fat content. For example, semi-skimmed milk has a fat content of 1.5-1.8%, skimmed milk has a fat content of at most 0.5% and the fat content of full-fat milk is standardized to 3.5%. When it comes from cows, milk usually has a fat percentage which is slightly higher, at approximately 4.5%, and which also differs from animal to animal. Furthermore, this percentage may vary during lactation and depending on the feed, the season and the degree to which the cow is milked, because the last milk in a milking is much fatter than the first.

All this takes place under the control of the control unit 5, which is configured, for example, as a computer system. This may be a single dedicated computer, but may also be a system comprising several subsystems which are operatively coupled to each other. The control unit 5 thus controls, for example, the at least one milking device, comprising components which are not indicated in more detail here, such as a pulsator and a milk vacuum pump, and also for example the first and second milk pumps 9 and 11, as well as the standardization device 20 and/or the components thereof (diagrammatically indicated by the single control connection). In order to control the milking system 1, the control unit 5 may furthermore use the database 6 and/or sensor 7 which are operatively connected thereto. All this will be explained in more detail below.

According to the invention, the control unit 5 can control the standardization device 20 in different ways. Firstly, the control unit 5 can use animal-specific milk information which is stored in a database 6, as is diagrammatically indicated in the figure. This database contains, for example, milk data of the milk from the milking cows collected by sampling or obtained from a milk factory or otherwise. Although the fat content does vary slightly, this variation occurs relatively slowly and also, with semi-skimmed milk for example, some margin with regard to the fat content is permissible. Therefore, the control unit 5 is able to control the device 20 with sufficient accuracy on the basis of these data.

Alternatively or in addition, and for more accuracy, a sensor 7 is provided in this embodiment for measuring a fat content. Such sensors are known per se and operate, for example, on the basis of light which is reflected and/or absorbed/transmitted by the milk in the pipe from the milking cup 3 to the first milk jar 8. Depending on the fat content, noticeable shifts will occur in the spectra. The sensor 7 collects the data relating to the fat content in-line. The control unit 5 which is connected to the sensor 7 can collect the fat data and combine them with milk flow data from a milk volume meter (which has been provided as usual but is not shown) to produce a time-dependent fat content. By "integrating", i.e. adding the milk flow-weighted fat-content value, the control unit 5 is able to determine a total amount of fat, or a fat content for the entire milking. In this way, a current fat content is provided which therefore automatically takes changes in feed, days in lactation, etc. into account.

Incidentally, it is also possible to provide an alternative sensor 7, for example in the milking cup 3. Alternatively, a sensor is placed in the first milk jar 8 where no in-line measurement has to take place. Here, the sensor can determine the fat content of the milking in one attempt. As another alternative, the or a sensor may also be placed in the second milk jar or in a milk pipe, somewhere between the first milk jar 8 and the standardization device 20. The embodiment with the illustrated sensor 7 will be described in more detail below.

When the milking system 1 is in use, a cow 100 will present itself at the milking device 2 and the animal identification device 30, such as a tag-reader, will read out the ID tag 102. Of course, other identification means and methods are also possible, provided that the identity of the animal can be determined. Subsequently, the control unit 5 can retrieve the data associated with this cow from database 6. From these data, the control unit knows, for example, that the milk of the identified cow contains (on average) 4.3% fat. In order then to skim the milk of the milking to 1.5% in the case of a milking of, for example, 15 liters, as measured by the milk volume meter (not shown), the control unit performs the following steps. The 1.5% fat of 15 liters may be provided by 15×(1.5/4.3)=5.2 liters of milk which are then allowed to pass through via the second branch line 25 as unprocessed milk. The remaining 9.8 liters can then be skimmed to produce skimmed milk. The control unit 5 will therefore send 9.8 liters of milk from the milking to the skimmer 23 via the first branch line 22 by switching the three-way valve 21 accordingly. The respective amount of 9.8 liters can be measured by means of a flow meter which is not shown, but provided, for example, in the milk pipe 12. In this case, the control unit may opt to separate the 9.8 liters at the start of the milking, at the end or somewhere in between, or may even alternate between allowing a part to pass through, skimming a part, allowing a part to pass through, etc.

The skimmer 23 is, for example, a centrifuge, as is known per se in the field of milk processing. The cream separated off by the skimmer 23 may be discharged to a cream tank 14 in order to be stored, cooled and/or packaged. This will not be described in any more detail.

Both milk streams come together in the combining device 26 in order to be combined there to form the milk product "semi-skimmed milk" which is then stored, for example, in the first milk product tank 13-1 containing semi-skimmed milk via the first milk product line 28-1. The combining device 26 does not, for example, have to be much more than a convergence of the two (or optionally more) pipes through which the part-streams flow. In this case, the device 26 may be provided with non-return valves or the like in order to prevent undesired mixing of part-streams. Furthermore, one or more pumps for the part-streams may be provided in the combining device, and/or other metering devices which may assist in metering the part-streams efficiently and/or in the desired ratio. However, these do not form part of the scope of the invention here and neither do devices such as pasteurizing, homogenizing, cooling and other devices which may optionally be provided in the milking system.

In a similar manner, the control unit 5 could also produce "full-fat milk" containing 3.5% fat by allowing 15×(3.5/4.3) =12.2 liters to pass untreated and skimming the remaining 2.8 liters and then combining this with the unprocessed milk. The control unit will then switch the second three-way valve 27 to the second milk product line 28-2, towards the second milk product tank 13-2 "full-fat milk". Depending on the current demand for a specific product, the control unit 5 is able to produce the respective milk product virtually on the spot. It will be clear that this milking system makes it possible to save energy by not skimming off cream unnecessarily and then adding it again in a certain ratio. Also, it is easier and more accurate to remove the cream from a large volume than to add a (very) small volume of cream again. As an indication: if 15 liters were to be skimmed completely, only 225 ml of cream would have to be added to produce semi-skimmed milk. Particularly when processing only cream from one milking which may, in practice, be even 50% smaller, a highly inaccurate method would be obtained. By contrast, skimming approximately 3 to 12 liters of milk (in the abovementioned examples) can be achieved simply and with sufficient accuracy. Furthermore, it is exactly the processing of the milk per milking, on the basis of data obtained or otherwise available, which is a strong point of the invention, and which can, in addition, take place accurately in the way of the invention.

Obviously, it is also possible to separate other products by providing separate tanks for this purpose. Thus, it is possible to collect special milk, for example from genetically different animals, separately, if desired also as skimmed, semi-skimmed and/or full-fat milk.

Furthermore, it is possible to standardize other contents as an alternative to or in addition to fat, such as a protein or lactose content. To this end, distributors, separators and combining devices may also be provided, in a way similar to that for the milk fat.

The details of robotic milking devices 2, 2' are sufficiently well-known as such and will not be discussed here in greater detail than necessary. Thus, standard components such as a vacuum pump and a teat-detection system have not been illustrated. It should be noted that, with the illustrated milking system 1, optional measures have been taken which are advantageous with regard to the capacity and furthermore in case several milking devices 2, 2' are present. In particular, the milk of a milking is collected as a milking in a first milk jar 8, as is customary per se. From there, a first milk pump 9 pumps the milking further down the milking system in, in the direction of a ultimately a milk storage tank. In order to make the milking device 2 available for a subsequent milking as quickly as possible, the first milk pump 9 will have a high flow rate, which is not very favorable for the subsequent milk treatment device 20 which consequently has to have a large (peak) capacity. In order to solve this problem, a second milk jar 10 is provided which collects the milking from the first milk jar 8, after which a second milk pump 11 can pump the collected milking into the milk pipe 12 at a much lower flow rate. Such an arrangement is advantageous in order to provide a high capacity of the milking device 2 due to a short down time, and furthermore for the milk treatment device 20, due to the fact that the supply of milk can be much more steady. After all, the second milk pump can pump the previous milking for the entire duration of the milking. In addition, it is more favorable if the milk can travel a relatively large part of the way through the milk pipes at a relatively low velocity. Nevertheless, it should be noted here that the advantage of the invention with regard to the energetic and with regard to accuracy advantageous processing per milking.

If several milking devices 2, 2' are provided, as is the case in the present embodiment, the milkings should preferably remain separate. To this end, the control unit 5 can control the relevant milk pumps in a coordinated manner with respect to each other. For example, in the present case, comprising two milking devices and two second milk pumps 11', the control unit 5 will first pump a complete milking into the milk pipe 12 by means of a second milk pump 11 or 11'. If, in the meantime, a milking has been completed in the other of the two milking devices and the milking was already pumped to the second milk jar, the controlling will wait before actuating the respective second milk pump until the preceding milking has been processed in the milk treatment device 20. It will be clear that in case of several milking devices 2, 2' for each milk pipe 12 and/or milk treatment device 20, the pumping velocity of the second milk pumps 11, 11' is preferably adjusted, in this case increased, in order to reduce the waiting time without (too) adversely affecting the capacity of the milking system. It is furthermore emphasized here that the second milk jars 10 and the associated second milk pumps 11, 11' are optional. It is certainly possible to collect the milk in the first milk jar 8 and pump it with the first milk pump 9 while retaining the advantages of the invention of separation of milkings and advantageous processing of the milk.

LIST OF REFERENCE NUMERALS

1 Milking system
2, 2' Robotic milking device
3 Milking cup
4 Robot arm
5 Control unit
6 Database
7 Sensor
8 First milk jar
9 First milk pump
10 Second milk jar
11, 11' Second milk pump
12 Milk pipe
13-1, 13-2 Milk product tank
14 Cream tank
20 Milk treatment device
21 Splitting device, first three-way valve
22 First branch line
23 Removing device, skimmer
24 Cream discharge
25 Second branch line
26 Combining device
27 Second three-way valve
28-1, 28-2 Milk product discharge
30 Animal identification device
100 Dairy animal
101 Teat
102 ID tag

The invention claimed is:

1. A milking system, comprising:
an automatic robotic milking device having a control unit, the milking device being configured to milk a dairy animal fully automatically to form a milking; and
a milk treatment device connected to the milking device for receiving and treating milked milk of the milking, wherein the milking device further comprises:
an animal identification device operatively connected to the control unit for identifying the dairy animal, the identification device comprising an animal database with information about at least a composition of the milk from the dairy animal, and/or
a milk sensor device operatively connected to the control unit for collecting information about the composition of the milked milk,
wherein the milk treatment device is connected to the control unit for receiving said information, and the milk treatment device comprises a standardization device which is configured to standardize a fat content and/or a protein content of the milk of the milking,
wherein the milk treatment device controls the standardization device to standardize the milk of the milking based on information associated with that milking.

2. The milking system as claimed in claim 1, wherein the standardization device comprises:
a splitting device for splitting the received milking into an adjustable first part and a second part,
a removing device for receiving said first part of the milking, and for removing fat and/or protein from the first part, and dispensing the milk of the first part thus processed as processed milk, and
a combining device for combining the processed milk and the second part of the milking to form standardized milk,
wherein the standardization device sets a ratio between the first part and the second part by means of the splitting device, based on the information received about said milking.

3. The milking system as claimed in claim 2, wherein the removing device comprises a centrifuge for skimming the first part.

4. The milking system as claimed in claim 1, wherein the milking device comprises a robotic milking device which is voluntarily visitable by the dairy animal.

5. The milking system as claimed in claim 1, further comprising a plurality of automatic milking devices, each of the plurality of milking devices is connected to the milk treatment device, and
wherein the control units of each milking device are configured to send each milking, together with the associated information, to the milk treatment device separately.

6. The milking system as claimed in claim 5,
wherein each milking device comprises a first milk jar for collecting the milking and a first milk pump for pumping the milking out of the milk jar,
wherein each first milk jar is connected to a milk pipe connected to the milk treatment device, and
further comprising a second milk jar provided between each first milk pump and the milk treatment device for collecting the milking pumped by the first milk pump, and a second milk pump for pumping the milking from the second milk jar to the milk treatment device.

* * * * *